July 16, 1946.   H. G. BUSIGNIES   2,403,967
RADIO DIRECTION FINDER
Filed Feb. 27, 1941   2 Sheets-Sheet 1

Inventor:
HENRI G. BUSIGNIES
By
Attorney

Inventor:
HENRI G. BUSIGNIES

Patented July 16, 1946

2,403,967

UNITED STATES PATENT OFFICE 2,403,967

RADIO DIRECTION FINDER

Henri G. Busignies, Forest Hills, N. Y., assignor to International Standard Electric Corporation, New York, N. Y., a corporation of Delaware Application February 27, 1941, Serial No. 380,759

20 Claims. (Cl. 250—11)

The present invention relates to radio direction finders and more particularly to such direction finders as are adapted to give a direct reading indication at a distance. In certain aspects the invention is also applicable to radio signal indicating apparatus of other types than direction finders, such as for example radio altimeters or distance finders.

The invention is particularly intended for use in direction finders and related signal receivers of the type employing a cathode ray tube as an indicator.

For transmitting to a distance the direction finding indications derived from a pair of crossed loops, an Adcock antenna, a rotation loop, or the like, it is desirable to employ a carrier wave having a frequency of 100 kilocycles—say between 30 kilocycles and 300 kilocycles. In accordance with one feature of the present invention therefore the direction indicating signal derived from a pair of crossed loops or the like is transferred to a low radio frequency carrier preferably by detecting the received indications and then remodulating the low radio frequency carrier thereby.

In accordance with another feature of my invention the low frequency carrier bearing the directional signals is transmitted to a distant point and there detected to yield waves having the frequency of rotation of the original pickup loop or other scanning arrangement, and these waves are then applied to a cathode ray tube to give the direct reading indication.

In accordance with an important feature of my invention a crossed-stator variocoupler device similar to those commonly employed for combining the indications from two crossed loops on to one single circuit is connected in inverted fashion so as to distribute signals from a single circuit to a pair of separate circuits which are connected to the two crossed-stators of the device in question. Preferably the two circuits to which signals are distributed by such device consist of two channels (e. g., coaxial lines, radio channels, etc.) which serve to transmit the directional indications to a remote point where they are detected and applied to a cathode ray oscillograph.

The exact nature of the invention can best be understood from the following detailed description taken in connection with the attached drawings, in which Fig. 1 is a circuit diagram representing one embodiment of my invention.

Figure 1:
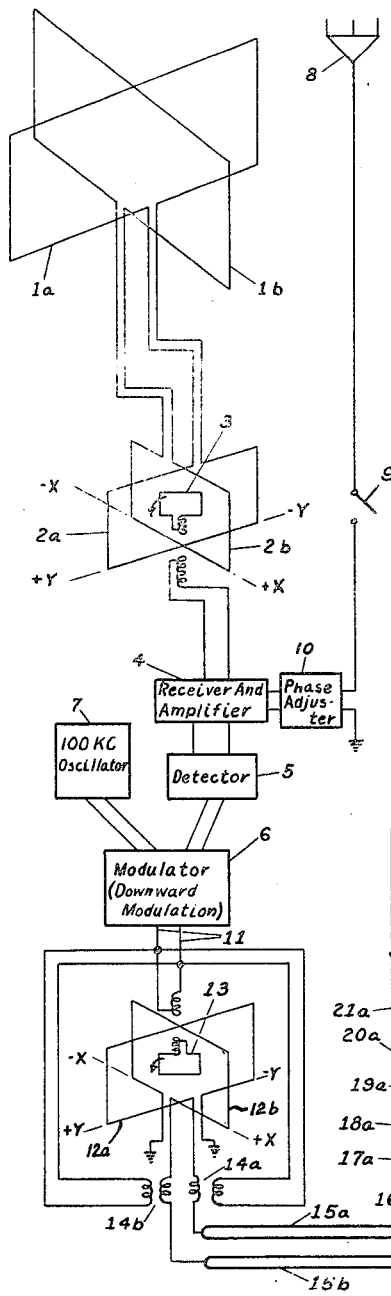

Referring more particularly to Fig. 1, crossed loops $1a$ and $1b$ receive a radio signal whose direction is to be determined and transmit their received energy to a pair of crossed-stators $2a$ and $2b$, respectively. A search coil $3$ is arranged to rotate continuously, by means not shown, within the stators $2a$ and $2b$ and is coupled to the input of a receiver and amplifier $4$.

The coupling between the rotating search coil $3$ and the receiver $4$ may be made by means of conventional slip rings with brushes but is preferably made by means of a capacitative or even better an electromagnetic coupling as schematically represented in the drawings.

The receiver $4$ may be of any type suited to the range of wave lengths to be handled but is preferably of the superheterodyne type wherein the received carrier is reduced to a more convenient intermediate frequency by heterodyning. The output of receiver $4$ is detected in detector $5$ and then applied to a modulator $6$, which is also fed with continuous oscillations, preferably of a low radio frequency, from a local oscillator $7$.

For sensing purposes a non-directional antenna $8$ is connected through a switch $9$ and a phase adjuster $10$ to a suitable point in receiver $4$ preferably ahead of any heterodyning stages. Thus when switch $9$ is closed the energy of antenna $8$ is added to the energy received from search coil $3$ so as to give a sensing indication in known manner.

A modulator $6$, which is fed with oscillations from $7$ and with signals from detector $5$, is preferably of the type which produces downward modulation, i. e. in the output of which the largest amplitudes are produced in response to the least amplitude of signals from detector $5$.

The output of modulator $6$ is applied over line $11$ to rotor coil $13$ of a crossed-stator variocoupler generally similar to $2a$—$2b$—$3$. This rotor $13$ preferably rotates in exact synchronism with rotor $3$ so as to occupy at every instant with respect to stator coils $12a$ and $12b$ the same position as rotor 3 occupies with respect to stators 2a and 2b at the same instant. The stators 12a and 12b deliver their energies respectively over coaxial lines 15a and 15b to a remote point at which indications with respect to direction are to be given.

At the said remote point the signals from lines 15a and 15b pass over blocking condensers 16a and 16b, impedance matching tuned network 17a and 17b and further blocking condensers 18a and 18b to rectifiers 19a and 19b where the signals are detected. The detected signals then flow through load resistances 20a and 20b thus producing potentials which are amplified by triodes 21a and 21b and then applied to deflecting plates 22a and 22b of a cathode ray oscillograph tube. The cooperating deflecting plates 23a and 23b are returned to an adjustable potential point for centering the pattern to be produced on the screen of the oscillograph tube. Plates 23a and 23b are shown as joined together but if desired these may be separated so as to permit a separate adjustment of the potential thereof and/or any known means for varying the direct current bias of deflector plates 22a and 22b may be provided.

The operation of the system in Fig. 1 may be described as follows:

Assume that the signal to be observed is being propagated from above down into the plane of the paper in Fig. 1 so as to strike both loop 1a and loop 1b at 45°, then equal signals will be developed in stators 2a and 2b, these signals having such phases that no energy at all will be transmitted to rotor 3 at the moment when the latter is in the position shown in the figure.

As rotor 3 rotates so that the side marked with an arrow approaches the direction "+Y" however, the energization therein increases to the value which would be produced by stator 2a alone, and as rotor 3 continues so that the "arrow marked" side thereof approaches midway between "+X" and "+Y," the radio frequency amplitude induced in this rotor increases further to a maximum; then as rotor 3 continues to turn so that the "arrow marked" side arrives at the direction of "+X" and then midway between the directions "+X" and "−Y," the radio frequency amplitude therein diminishes to the value due to stator 2b alone and then further diminishes to zero.

During the next half revolution while the "arrow marked" side of rotor 3 passes from the direction intermediate "+X" and "−Y," through "−Y," then to the direction intermediate "−Y" and "−X," the radio frequency energy induced in rotor 3 rises again to a maximum but with a phase opposite to the phase which was induced therein during the first half revolution, finally as the "arrow marked" side passes through the direction intermediate "−X" and "−Y" through the direction of "−X" back to its initial direction intermediate "−X" and "+Y," the reversed phase energization of rotor 3 again dies down to zero.

Figures 3, 4:
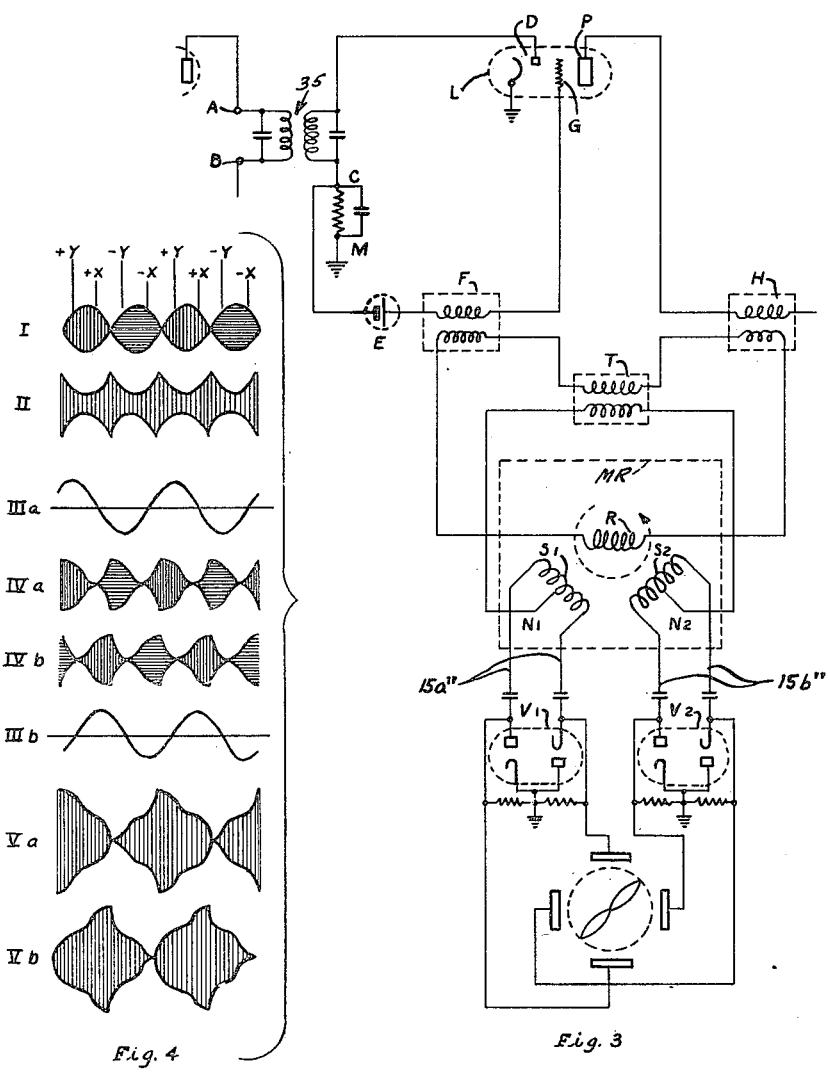
Fig. 3 is a further circuit diagram showing another possible modification of my invention.
Fig. 4 is a series of aligned curves used in explaining the operation of the apparatus of Fig. 1.

Curve I of Fig. 4 clearly shows how the energization in rotor 3 (and consequently at the input of receiver 4) varies during the rotation of this rotor. The ordinates of the curves of Fig. 4 represent amplitude while the abscissae represent time. It will be noted that the first loop of curve I is section lined vertically, the second one horizontally, the third one vertically, etc., to represent the fact that the carrier waves of the first portion are of a given phase, those of the second portion are of an opposite phase and those of the third portion are again of the given phase, etc. The points marked "+Y," "+X," "−Y," "−X," etc., at the top of Fig. 4 represent the instants at which the "arrow marked" side of rotor 3 (or rotor 13) passes through the directions "+Y," "+X," "−Y," "−X," respectively.

The receiver 4 after amplifying the signal applied thereto and perhaps changing the frequency of this signal by heterodyning, applies to the detector 5 a signal having substantially the form shown in curve I of Fig. 4. The detected signal therefore has the form of an ordinary rectified sine wave and it then acts in modulator 6 to downwardly modulate the 100 kc. oscillations from oscillator 7.

The output delivered to line 11 therefore has approximately the form illustrated in curve II of Fig. 4. The reason for employing downward modulation is to increase the sharpness of the indication utimately to be given in the cathode ray tube.

Figure 6:
Figs. 5, 6 and 7 are representations of the patterns obtained on the screen of a cathode ray oscillograph in response to the application of different types of signals thereto.
Figure 5:
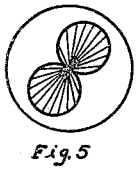

Fig. 5 shows the kind of indication that would be given if the output of receiver 4 were directly applied to a cathode ray oscillograph tube while simultaneously rotating the deflector plates thereof. It will be noted that this figure-8 shaped pattern does not lend itself to extremely accurate reading. By virtue of the downward modulation which transforms the wave of curve I into a wavelike curve II, it becomes possible to obtain a pattern having generally the shape of an aeroplane propeller with sharply pointed end, as shown in Fig. 6 instead of the pattern shown in Fig. 5.

If it were convenient to mount the cathode ray indicator tube adjacent rotor 3 and to rotate the deflection coils thereof mechanically in synchronism with rotor 3, it would then be sufficient to connect line 11 to a pair of opposite deflecting coils of the rotary set of deflecting coils. A second pair of deflection coils would then be unnecessary.

It is one object of the present invention, however, to provide means for giving direction indications at some distance from the rotary search coil 3. Therefore, in accordance with a feature of the present invention the apparatus 12a, 12b, 13 is provided to distribute the signals from line 11 to the two separate circuits 15a and 15b.

The effect of rotation of rotor 13 is to produce vario-coupling with respect to the stators 12a, 12b, the coupling factors being sinusoidal and being displaced 90° so that the coupling to 12a is maximum while the coupling to 12b is zero and vice versa. The exact coupling factors of coil 13 with respect to stators 12a and 12b, respectively, are illustrated in curves IIIa and IIIb.

The two waves delivered to lines 15a and 15b may be considered as consisting of the wave shown in curve II multiplied by the coupling factors of IIIa and IIIb, respectively. The general shape of these wave forms is illustrated in curve IVa for line 15a and curve IVb for line 15b.

Before describing the action of detecting and amplifying equipment 17a—21a and 17b—21b, as well as the related action of transformers 14a and 14b, it will be convenient to consider what patterns would be produced if lines 15a and 15b were connected respectively to plates 22a and 22b of the cathode ray tube. If such a connection were made a pattern having approximately the shape of an aeroplane propeller would be produced as shown in Fig. 6, this pattern being represented not merely by luminous tracings around its outline but being rather luminous throughout. This may be better understood if one assumes for a moment that line 11 is fed with a constant amplitude radio frequency instead of with a wave of the form shown in curve II.

With such constant amplitude wave delivered from line 11 to rotor 13 the waves induced in lines 15a and 15b would have amplitudes varying in accordance with the coupling factors shown in curves IIIa and IIIb, respectively. Where the coupling factors were negative this would merely mean that the phase of the 100 kilocycle carrier would be reversed. Thus, the wave in line 15a would resemble the wave of curve I displaced in time so that its loops of positive phase correspond to the maxima of curve IIIa while its loops of negative phase correspond to the valleys of curve IIIa. Similarly, the wave in 15b would have the form of curve I displaced in time so as to correspond to curve IIIb.

The pattern produced in the oscillograph tube would then have the form of a straight diametral line which would extend between plates 22a and 23a when rotor 13 had its maximum coupling to stator 12a and would extend between plates 22b and 23b when rotor 13 had its maximum coupling to stator 12b. The diametral line would revolve with rotor 13 producing by persistence of vision the appearance of a luminous disc.

Now then considering that the signal delivered to line 11 for modulator 6 would not actually give a constant signal but would rather vary as shown in curve II, and considering further that the amplitude variations of such signal would be synchronized with the rotation of rotor 3 and therefore also with the rotation of rotor 13, it can be seen that the actual pattern which would result from connecting lines 15a and 15b directly to plates 22a and 22b, would be a propeller shaped pattern such as shown in Fig. 6 instead of a luminous disc.

The above described arrangement is perfectly useful when dealing with unmodulated unkeyed radio signals and should be regarded as within the scope of my invention. When the above described arrangement is employed for direction finding with radio signals which are keyed or interrupted however, the propeller shaped indications given are interspersed with sector shaped patterns as shown in Fig. 6. These sector shaped patterns result from the cessation of the incoming signal which in turn corresponds to a sudden increase of output of modulator 6 to its maximum value regardless of the position of rotor 3. Such sector shaped interference marks are very annoying because of their size and brightness and may in some cases overlie the propeller shaped direction indication in such a way as to almost wholly mask the latter.

Figure 7:

In order to avoid these difficulties, the detectors 19a and 19b are provided in accordance with my invention, as shown in Fig. 1. One result of detecting the signal from lines 15a and 15b and then superposing the detected signal (rather than the 100 kilocycle signal) on oscillograph plates is to change the propeller shaped pattern from a solid luminous pattern to one represented merely by a luminous outline. At the same time any interference marks which may occur will now have the form of arcs of circles rather than sectors of luminosity. As is apparent from Fig. 7 such arcs cannot mask the direction indication even if such arcs should extend across the end of the direction indicating pattern.

Another inherent result of the detection operation is, however, to restrict the directional pattern to a single quadrant of the oscillograph screen. In fact the pattern appears just as if Fig. 7 had been traced on transparent Cellophane and then folded in quarters. Only one half of the propeller shaped pattern shows and this is always in the same quadrant, no matter which quadrant the incoming signal may be arriving from. The reason for this is that by detection of the wave forms IVa, IVb the difference between the positive and negative phases has been abolished and thus every one of the loops of curve ICa will result in a positive signal on plate 22a. It will be noted that for proper operation the successive loops of curve IVa should produce positive, then negative, then positive, then negative potentials on plate 22a. Similarly, the detection of the signal from line 15b has destroyed the distinction between positive and negative phases of the alternate loops of curve IVb.

In accordance with a further feature of my invention this disadvantage is avoided while still retaining the advantage of detection of the signals before application to the oscillograph tube. One manner in which this can be done is by adding to the waves of curves IVa and IVb sufficient unmodulated 100 kilocycle oscillations to render these waves wholly of positive phase as shown in curves Va and Vb. I prefer, however, to add waves having the form of curve II and taken from the output of modulator 6. As shown in Fig. 1 therefore transformers 14a and 14b are provided for coupling into lines 15a and 15b, respectively, a sufficient amount of the energy from lines 11 to prevent the resultant waves from ever reversing in phase.

The operation of these transformers may be regarded either as adding a wave resembling curve II to each of the waves of 14a and IVb or alternatively may be regarded as upwardly displacing coupling factor curves IIIa and IIIb so that these lie wholly above their zero axes. The wave form resulting in lines 15a and 15b somewhat resembles curves Va and Vb, except that a still greater sharpness of the pointed peaks results from the fact that curve II, rather than a corresponding amount of unmodulated carrier, was added to the original curves IVa and IVb.

In the system represented in Fig. 1 it is assumed that lines 15a, 15b are some miles in length and therefore amplifier tubes 21a and 21b have been provided between the detectors 19a and 19b and the oscillograph. It will be understood that if these lines are shorter such amplifiers may be omitted whereas if they are longer pre-amplifiers ahead of the detectors 19a and 19b may be desirable.

Figure 2:
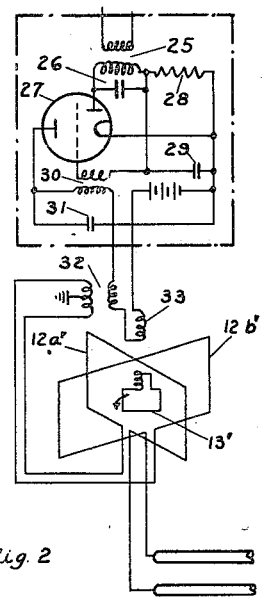
Fig. 2 is a circuit diagram illustrating how certain portions of the arrangement of Fig. 1 may be modified.

Fig. 2 represents a portion of a system which may be substituted for detector 5, modulator 6, oscillator 7, and distributing variocouplers 12a, 12b, 13, 14a, 14b. The circuit shown in the upper portion of Fig. 2 constitutes a combined detector, modulator and oscillator replacing elements 5, 6 and 7 of Fig. 1.

An incoming signal from a receiver, such as receiver 4 of Fig. 1, is applied over transformer 25 and tuned circuit 26 to the diode section of a so-called "diode-triode" 27 which is a tube having a triode assembly and in addition thereto a detector or diode plate in cooperative relation to the cathode of such triode assembly. The resulting detected current flows through load resistor 28 thus producing a negative bias for the grid of the triode element of tube 27. Condenser 29 bypasses resistor 28.

The anode cathode circuit of the triode element is coupled by a transformer 30 to the grid cathode circuit of this same triode thus producing oscillations in known manner. A condenser 31 tunes the primary of transformer 30. In series with such primary of transformer 30 are connected primary of a transformer 32 and a coupling coil 33. This coupling coil 33 is coupled preferably closely, with rotor 13' of a crossed-stator variocoupler 13', 12a', 12b' essentially similar to the corresponding variocoupler of Fig. 1. The transformer 32 is connected as shown to the stator coils so as to replace the two transformers 14a and 14b of Fig. 1.

The manner of operation of the system when modified to contain the elements of Fig. 2 is essentially the same as the manner of operation of the unmodified system, except that the single circuit 25—31 performs the several functions of the three circuits 5, 6 and 7 of Fig. 1, whereas the single transformer 32 of Fig. 2 replaces two transformers 14a and 14b of Fig. 1.

Still another modification which may be made of the system of Fig. 1 is illustrated in Fig. 3 which is intended to replace so much of Fig. 1 as follows the receiver and amplifier 4: AB represents a fragment of the output of receiver 4. This output is coupled to tuned circuit 35 which is connected across the diode portion D of a diode triode tube L, preferably of the type known as 6Q7. The current rectified by this diode portion D flows through a load resistor M, by-passed by a condenser C and thus produces an additional negative bias for grid G of the tube L.

This grid G which is additionally biased by a small biasing cell E, is coupled over transformer F with a mechanically rotatable circuit MR. This mechanically rotatable circuit includes a rotor coil R of a crossed-stator variocoupler, as well as three series windings forming parts of three transformers F, H, and T. Although these three transformers F, H, and T are schematically shown by the usual symbols for fixed transformers, it will be understood that the three windings thereof, which are included in the circuit FR, are preferably coaxially arranged around the axis of rotation of the circuit MR so that the couplings of these windings to the cooperating stationary windings of the transformers F, H, and T are not altered by rotation of MR.

The stationary winding of transformer H is connected to plate P of tube L and thus the grid and plate circuits of this tube are coupled together by a sort of link coupling through circuit MR. The result is that oscillations are produced by tube L, the coil T being the principal frequency determining inductance and the natural distributed capacity thereof being the principal frequency determining capacity of the oscillator. The amplitude of the oscillations is modulated downward by the signals which are detected by diode section D. Thus, the tube L with its associated circuits performs the functions of detector 5, modulator 6 and oscillator 7 of Fig. 1, being in this respect similar to tube 27 of Fig. 2.

The stators N1 and N2 of the crossed-stator variocoupler of Fig. 3 are connected to balanced lines rather than to unbalanced or coaxial lines as in the other figures and it will be noted that these transformers and all connections thereof are completely symmetrical throughout.

The transformer T which induces the additional signal component independent of the rotation of the rotor R differs from transformer 32 of Fig. 2 in that its primary forms part of the rotating portion MR of the variocoupler whereas its secondary is connected to the mid-points of the two stators M1 and M2 so as to preserve symmetry.

In order to still further preserve the symmetry of the system, the symmetrical 2-wire transmission lines 15a'' and 15b'' are connected to symmetrical full wave detectors rather than to half wave detectors and the output of each of these is applied symmetrically to the two opposite deflection plates of a pair.

In the foregoing description of the operation of Fig. 1 and the several modifications thereof it has been assumed that sensing switch 9 was open. If this switch be closed the bidirectional indication shown in Fig. 6 or 7 and described in the description of operation is replaced by a unidirectional indication in known manner. This unidirectional indication is displaced from the bilateral indication by 90° in known manner, unless a compensatory change of connections is made at the same time switch 9 is closed. Also the unidirectional indication is somewhat less sharp for the reason that the addition of the constant-phase signal from antenna 8 to the reversible-phase signal from rotor 3 changes the shape of the signal envelope from a half-sine shape having sharp cusp-like minima to a full-sine shape having rounded minima. It is therefore preferred to take bearings with switch 9 open, using this switch only for sensing, although it is within the scope of my invention to operate with switch 9 continuously closed.

In the embodiment illustrated and above described, the signals of the type of curve I, Fig. 4 are detected and then used to downwardly modulate a new carrier which may have any value but is preferably of a low radio frequency. It is possible to employ ordinary upward modulation instead of the downward modulation of the new carrier while still retaining most of the advantages of the invention; the detector circuit which detects the new carrier and thereby energizes the cathode ray deflector plates is then preferably reversed so that the cusp-shaped points of the detected signal correspond to outward radial deflections of the ray as before.

It is furthermore possible to gain many of the advantages of the invention even if neither the downward modulation nor the above mentioned reversal of the detector circuits are employed, so that the pointed cusps will not correspond to outward radial deflections. The use of an "inverted" variocoupler (i. e. one which distributes the signals from one channel to two channels) with a carrier wave for example is of great advantage, especially if such variocoupler is of the type shown, which has electromagnetic feed from input line 11 to the rotor 13 instead of slip rings. If the advantage of sharp cusps is not considered essential the steps of detecting and remodulating on to a new carrier may be eliminated, thus using the original received carrier (or one formed therefrom by heterodyning) as the carrier which is passed through the inverted variocoupler.

In general it is within the scope of my invention to use any one or more of the novel features or combinations of features of the system described with or without modifications, adaptations and alterations thereof.

It should be understood that the general system described in connection with Figs. 1, 2, 3, 4 may be used with other types of distributors than the preferred variocoupler type shown. For example, sliding contact distributors of the potentiometer type or electronic distributors may be used in place of the variocoupler type for distributing a signal over two channels. Likewise the variocoupler 2a, 2b, 3 which serves for combining two signals in one channel may be replaced by a potentiometer type mixer or by an electronic or other type of mixer without moving parts. Or if desired fixed loops 1a and 1b and stators 2a and 2b may be discarded, rotor 3 being directly used as a primary pick-up loop.

Furthermore the two coaxial lines 15a, 15b of Fig. 1 or 2 or the two balanced lines 15a'', 15b'' of Fig. 3 may be replaced by radio channels. If it is desired to use one single line or channel two different carrier frequencies may be provided to distinguish the two signals. For this purpose two oscillators like 7 would preferably be provided and the carriers therefrom would preferably be modulated by two modulators like 6. The modulated carriers would then be led to two separate rotors like 13. One of these rotors should cooperate with a single a stator like 12a while the other one cooperated with a single b stator like 12b, the coupling factors of these rotors to their stators being dephased by 90°. The two stators would then be connected to a single line or radio channel extending to a remote point. At the remote point the two different carriers would be separated by filters and then would be handled just like the outputs of lines 15a, 15b of Fig. 1.

What I claim is:

1. A radio direction finder comprising directional pick-up means for receiving signals from a radio wave whose direction is to be determined, means for effectively rotating the directional reception pattern of said pick-up means whereby the received signals are varied sinusoidally in amplitude, means for transferring the sinusoidally varying signals to a new carrier frequency, two signal channels, means for coupling said amplified varying signal of new carrier frequency to said two channels with coupling factors sinusoidally varying at the rate of rotation of said directional pattern, a cathode ray oscillograph having two deflection systems, and means for energizing said two systems in accordance with the signals in said two channels.

2. A direction finder according to claim 1, wherein said means for energizing said two systems in accordance with the signals in said two channels includes means for detecting the new carrier frequency signals in said two channels and means for applying the two detected signals respectively to said two deflecting systems, further comprising means for supplementing said sinusoidal coupling factors by constant coupling factors of sufficient magnitude to render the resultant coupling factors wholly unidirectional.

3. A radio direction finder comprising a constantly rotating member, pick-up means for deriving from an incoming radio wave a radio frequency signal varying in amplitude in dependence on the direction of said wave and the rotation of said member, means for detecting said radio frequency signal to yield a detected signal, means for producing a carrier modulated in accordance with said detected signal, two circuits for transmitting said modulated carrier, an electromagnetic vario-coupler having a single coil rotatable with respect to two coils disposed substantially in quadrature, means supplying said modulated carrier to said single coil, means connecting said two coils to said two circuits respectively, whereby said electromagnetic vario- coupler is connected to distribute said modulated carrier to said two circuits, a cathode ray oscillograph having two deflecting systems, and means for energizing said two deflecting systems, in accordance with the signals in said two circuits.

4. A radio direction finder comprising a constantly rotating member, pick-up means for deriving from an incoming radio wave a radio frequency signal of varying amplitude and reversing phase in accordance with the direction of said wave and the rotation of said member, means for detecting said radio frequency signal to yield a detected signal, means for producing a carrier modulated in accordance with said detected signal, two channels for transmitting said modulated carrier, an electromagnetic vario-coupler of the crossed-coil type having a crossed-coil unit and another coil, said unit and said other coil being rotatable with respect to each other and arranged to rotate in synchronism with said member, means supplying said modulated carrier to said other coil, means connecting the respective coils of said unit to said channels, whereby said electromagnetic variocoupler is connected to distribute said modulated carrier frequency to said two channels, means for separately detecting the carrier transmitted over said two channels, a cathode ray oscillograph having two deflecting systems, and means for applying the products of such separate detections to said two deflecting systems.

5. A direction finder according to claim 4, further comprising means for applying to said two channels, in addition to the outputs from said variocoupler, a wave of said carrier frequency and of sufficient amplitude to render the phase of the resultant wave in each of said two channels irreversible.

6. A direction finder according to claim 4, further comprising means for applying to said two channels, in addition to the outputs from said variocoupler, a wave of said carrier frequency, modulated in accordance with said detected signal and of sufficient amplitude to render the phase of the resultant wave in each of said two channels irreversible.

7. A radio direction finder comprising a constantly rotating member, pick-up means for deriving from an incoming radio wave a radio frequency signal varying in amplitude in dependence on the direction of said wave and the rotation of said member, means for detecting said radio frequency signal to yield a detected signal, means for producing a carrier modulated in accordance with said detected signal means for dividing said modulated carrier into two components, a cathode ray oscillograph at a point remote from said modulated carrier producing means, said cathode ray oscillograph including two deflecting systems, means for transmitting said two components of said modulated carrier frequency to said remote point, and means for energizing said two deflecting systems in accordance with said two component signals transmitted to said point.

8. A radio direction finder comprising a constantly rotating member, means for deriving from an incoming radio wave a signal varying in amplitude in dependence upon the direction of said wave and the rotation of said member, two circuits for transmitting said varying signal an electromagnetic variocoupler of the crossed field type having a crossed-coil unit and another coil, said unit and said other coil being rotatable with respect to each other, means supplying said varying signal to said other coil, means connecting the respective coils of said unit to said circuits to provide separate channels whereby variocoupler is connected to distribute said varying signal to said two circuits, an oscillographic indicator having two deflecting systems, and means for energizing said two deflecting systems in accordance with the signals in said two circuits.

9. A direction finder according to claim 8, wherein said means for deriving a signal varying in amplitude comprises pick-up means rotating in synchronism with said member, for receiving a radio frequency signal of varying amplitude and reversible phase, means for detecting said radio frequency signal to yield a detected signal whose frequency is twice the frequency of rotation of said member and whose wave form has sharp cusp-shaped minima corresponding to the instants of phase reversal of said radio frequency signal, and means for producing a carrier frequency modulated in accordance with said detected signal.

10. A direction finder according to claim 8, wherein said means for deriving a signal varying in amplitude includes rotary pick-up means for deriving a signal consisting of a carrier wave varying in amplitude in dependence upon the direction, and wherein said means for energizing said two deflecting systems includes means for detecting the carrier wave separately in each of said channels and means for applying each of said detected carrier waves to one of said deflecting systems, further comprising means for applying to said two circuits, in addition to the outputs from said variocoupler crossed-coil unit, a wave of said carrier frequency, said added waves being of sufficient amplitude to render the phase of the resultant wave in each of said circuits irreversible.

11. A direction finder according to claim 8, wherein said means for deriving a signal varying in amplitude includes rotary pick-up means for deriving a signal consisting of a carrier wave varying in amplitude in dependence upon the direction, and wherein said means for energizing said two deflecting systems includes means for detecting the carrier wave separately in each of said channels and means for applying each of said detected carrier waves to one of said deflecting systems, further comprising means for applying to said two circuits, in addition to the outputs from said variocoupler crossed-coil unit, a wave of said carrier frequency varying in amplitude in dependence upon the direction of the incoming radio wave and the rotation of said member, said added waves being of sufficient amplitude to render the phase of the resultant wave in each of said circuits irreversible.

12. A direction finder according to claim 8, wherein said means for deriving a signal varying in amplitude includes rotary pick-up means for deriving a signal consisting of a carrier wave varying in amplitude in dependence upon the direction, and wherein said means for energizing said two deflecting systems includes means for detecting the carrier wave separately in each of said channels and means for applying each of said detected carrier waves to one of said deflecting systems, further comprising means for applying to said two circuits, in addition to the outputs from said variocoupler crossed-coil unit, a wave of said carrier frequency taken from said means for deriving a signal, said added waves being of sufficient amplitude to render the phase of the resultant wave in each of said circuits irreversible.

13. A radio direction finder comprising a constantly rotating member, pick-up means for deriving from an incoming radio wave a radio frequency signal varying in amplitude to such degree as to undergo phase reversals in dependence on the direction of said wave and the rotation of said member, means for detecting said radio frequency signal to yield a detected signal whose frequency is twice the frequency of rotation of said member and whose wave form has sharp cusp-shaped minima corresponding to the instants of phase reversal of said radio frequency signal, means for producing a carrier modulated in accordance with said detected signal, two channels for transmitting said modulated carrier, an electromagnetic variocoupler of the crossed field type having crossed-coil means and another coil, said crossed-coil means and said other coil being arranged to rotate relatively and in synchronism with said member, means supplying said modulated carrier to said other coil, and means connecting crossed-coil means to said two channels, whereby said modulated carrier may be distributed to said two channels, a cathode ray oscillograph having two deflecting systems, and means for energizing said two deflecting systems, in accordance with the signals in said two channels.

14. A direction finder according to claim 13, wherein said means for energizing said two deflecting systems comprises means for applying said modulated carrier to said deflecting systems whereby the oscillograph is excited at carrier frequency.

15. A direction finder according to claim 13, wherein said means for energizing said two deflecting systems comprises means for separately detecting said modulated carrier waves in said two channels, and means for applying the separate detected signals to said two deflecting systems whereby said oscillograph is energized at a low frequency related to the frequency of rotation of said member.

16. A radio direction finder comprising a constantly rotating member, pick-up means for deriving from an incoming radio wave a radio frequency signal varying in amplitude to such degree as to undergo phase reversals in dependence on the direction of said wave and the rotation of said member, means for detecting said radio frequency signal to yield a detected signal whose frequency is twice the frequency of rotation of said member and whose wave form has sharp cusp-shaped minima corresponding to the instants of phase reversal of said radio frequency signal, means for producing a carrier modulated in accordance with said detected signal, two channels for transmitting said modulated carrier, an electromagnetic variocoupler of the crossed-field type having crossed-coil means and another coil, said crossed-coil means and said other coil being arranged to rotate relatively in synchronism with said member, means coupling said modulated carrier to said other coil, and means coupling said crossed-coil means to said two channels, whereby said modulated carrier frequency may be distributed to said two channels, means for separately detecting the carrier transmitted over said two channels, a cathode ray oscillograph having two deflecting systems, and means for applying the products of such separate detections to said two deflecting systems.

17. A direction finder according to claim 16, further comprising means for applying to said two circuits, in addition to the outputs from said variocoupler crossed-coil means, a wave of said carrier frequency and of sufficient amplitude to render the phase of the resultant wave in each of said two circuits irreversible.

18. A direction finder according to claim 16, further comprising means for applying to said two circuits, in addition to the outputs from said variocoupler crossed-coil means, a wave of said carrier frequency modulated in accordance with said detected signal, and of sufficient amplitude to render the phase of the resultant wave in each of said two circuits irreversible.

19. A radio direction finder comprising directional pick-up means for picking up a radio wave whose direction is to be determined, means for effectively rotating the directional reception pattern of said pick-up means whereby the received wave is varied in amplitude to such degree as to undergo phase reversals in dependence on the direction of said wave and the said rotation of the reception pattern, means for detecting said radio frequency signal to yield a detected signal whose frequency is twice the frequency of said rotation and whose wave form has sharp cusp-shaped minima corresponding to the instants of phase reversal of said radio frequency signal, means for producing a carrier downwardly modulated in accordance with said detected signal whereby the envelope of said modulated carrier has sharp cusp-shaped maxima, a cathode ray oscillograph having two deflecting systems, means for energizing said two deflecting systems in accordance with said modulated carrier.

20. A direction finder according to claim 19, wherein said oscillograph is located at a point remote from said modulated carrier producing means further comprising means for transmitting said modulated carrier to said remote point.

HENRI G. BUSIGNIES.